UNITED STATES PATENT OFFICE.

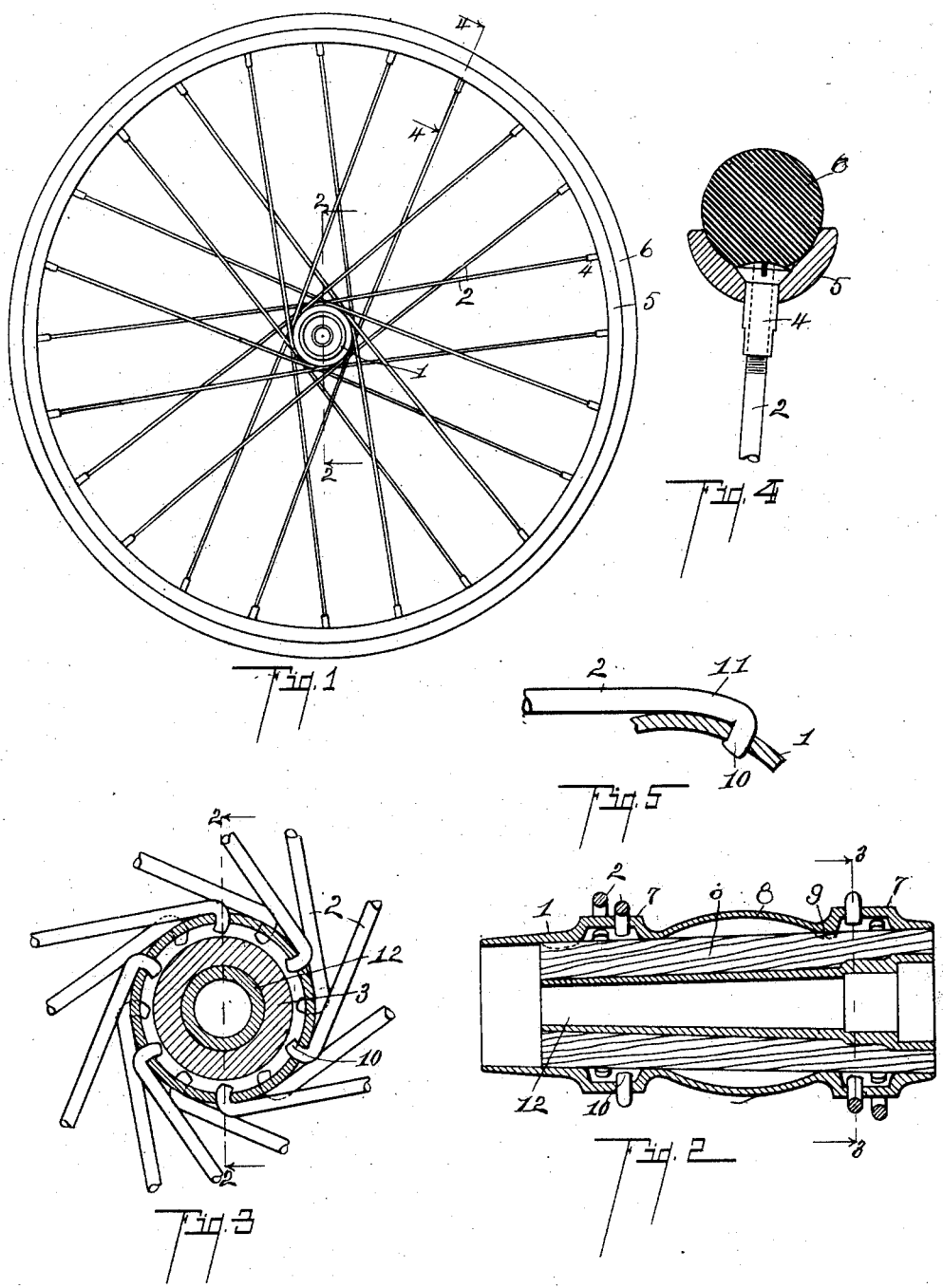

NELSON A. NEWTON, OF KALAMAZOO, MICHIGAN.

VEHICLE-WHEEL.

No. 879,301.            Specification of Letters Patent.            Patented Feb. 18, 1908.

Application filed August 16, 1906. Serial No. 330,890.

*To all whom it may concern:*

Be it known that I, NELSON A. NEWTON, a citizen of the United States, residing at Kalamazoo, county of Kalamazoo, and State of Michigan, have invented certain new and useful Improvements in Vehicle-Wheels, of which the following is a specification.

This invention relates to improvements in vehicle wheels. It relates particularly to improvements in vehicle wheels having metal spokes.

The objects of this invention are: First, to provide an improved vehicle wheel in which the tension on any particular spoke or on the entire wheel may be readily adjusted. Second, to provide an improved vehicle wheel having metal spokes in which any particular spoke can be readily removed for the purpose of renewal or repair without affecting the adjacent spokes. Third, to provide an improved vehicle wheel having metal spokes, which is very strong and durable and at the same time simple and economical to manufacture. Fourth, to provide an improved hub for vehicle wheels.

Further objects, and objects relating to structural detail, will definitely appear from the detailed description to follow.

I accomplish the objects of my invention by the devices and means described in the following specification.

The invention is clearly defined and pointed out in the claims.

The structure embodying the features of my invention is illustrated in the accompanying drawing, in which:

Figure 1 is a side elevation of my improved vehicle wheel. Fig. 2 is a detail section of my improved vehicle wheel taken on a line corresponding to 2—2 of Fig. 3. Fig. 3 is a cross section of the hub taken on a line corresponding to 3—3 of Fig. 2. Fig. 4 is an enlarged section through the rim of my improved vehicle wheel taken on a line corresponding to 4—4 of Fig. 1. Fig. 5 is an enlarged detail showing the inner end of one of the spokes and its relation to the hub.

In the drawing, similar reference characters refer to similar parts throughout the several views and the sectional views are taken looking in the direction of the little arrows at the ends of the section lines.

Referring to the drawing, the hub consists of a metal shell or hub proper with a wood bushing driven therein adapted to receive a boxing 12 which is of the common or any desired construction. The hub shell 1 is preferably provided with annular ribs or raised portions 7 towards each end and a central bulged or raised portion 8. The shell 1 is regularly tapered to receive the bushing 3 and is provided with inwardly projecting lugs 9 to prevent turning of the bushing therein, also to assist in retaining the same.

In the shell are holes adapted to receive the hooked ends 10 of the spokes 2, as clearly appears from the drawing. These holes are zigzagged or staggered so that one spoke does not in any way interfere with the manipulation or adjustment of the adjacent spokes. This staggering also adds to the rigidity of the assembled wheel. The inner ends of the spokes 2 are preferably curved at 11 to conform to the periphery of the hub.

The spokes are substantially tangential with the hub. The spokes secured at one end of the hub are preferably arranged oppositely of those secured at the other.

The outer ends of the spokes are secured to the rim by means of the internally threaded nipples 4 which are arranged through the rim from the outside and threaded upon the outer ends of the spokes. The tension of the spokes is adjusted by means of the nipple.

In the structure illustrated, I have shown a channeled rim adapted to receive a hard rubber tire, as 6. It is evident, however, that any rim or form of tire may be used in this relation.

The ribs or raised portions 7 of the shell are preferably chambered. This lightens the wheel and the ends of the spokes do not engage the wood bushing so that the spokes may be assembled in the wheel before the bushing is driven in. By bulging the central portion of the hub a structure which is very graceful in appearance is secured and one which is light and strong, as the shell is reinforced by the bushing and also the bushing may be more readily driven and is, I believe, more securely retained than if the shell contacted therewith from end to end, as there is a tendency for the central part of the bushing to expand, there being no compression thereon. For this bushing, cheap material may be used which would not be satisfactory for use in hubs generally. I thus secure a structure in which all the advantages of a wood hub are secured so far as the support of the boxing is concerned and also one which is strong and durable in other respects.

The curving of the inner ends of the spokes at 11 so that they are clamped down upon the hub when tension is applied thereto tends to draw the hooks into the hub and also effects to a considerable extent the vibration of the spokes. It is evident, as previously mentioned, that any particular spoke may be released without disturbing the adjacent spokes or the remaining spokes of the wheel. A further advantage is that in assembling the spokes the inner end is secured by merely hooking into the holes provided therefor and they are then drawn into place and the tension of the wheel regulated by means of the nipples at the outer ends of the spokes.

I have illustrated and described my improved vehicle wheel in detail in the form preferred by me on account of its structural simplicity and economy, although I am aware that it is capable of considerable modification in structural detail without departing from my invention.

Having thus described my invention, what I claim as new, and desire to secure by Letters Patent, is:

1. In a vehicle wheel, the combination of a rim or felly; a hub comprising a metal shell having a central raised portion and annular ribs or raised portions towards each end thereof, said rib portions having holes therein, the holes of each rib being arranged in a zigzag manner; a suitable boxing; a wood bushing, said boxing forced into said shell; inwardly projecting lugs in said shell adapted to engage said bushing; metal spokes threaded at their outer ends and having hooks at their inner ends, adapted to be inserted in the holes in said hub shell, the inner ends of said spokes adjacent to the hooks thereof being curved to conform to the hub, said spokes being arranged substantially tangential, those at one end of the hub being arranged tangentially opposite to those at the other; and nipples arranged through said rim threaded upon the outer ends of the spokes, for the purpose specified.

2. In a vehicle wheel, the combination of a rim or felly; a hub comprising a metal shell and annular ribs or raised portions towards each end thereof, said rib portions having holes therein, the holes of each rib being arranged in a zigzag manner; a suitable boxing; a wood bushing, said boxing forced into said shell; metal spokes threaded at their outer ends and having hooks at their inner ends, adapted to be inserted in the holes in said hub shell, the inner ends of said spokes adjacent to the hooks thereof being curved to conform to the hub, said spokes being arranged substantially tangential, those at one end of the hub being arranged tangentially opposite to those at the other; and nipples arranged through said rim threaded upon the outer ends of the spokes, for the purpose specified.

3. In a vehicle wheel, the combination of a rim or felly; a hub comprising a metal shell having a central raised portion and annular ribs or raised portions towards each end thereof, said rib portions having holes therein, the holes of each rib being arranged in a zigzag manner; a suitable boxing; a wood bushing, said boxing forced into said shell; inwardly projecting lugs in said shell adapted to engage said bushings; metal spokes threaded at their outer ends and having hooks at their inner ends, adapted to be inserted in the holes in said hub shell, said spokes being arranged substantially tangential, those at one end of the hub being arranged tangentially opposite to those at the other; and nipples arranged through said rim threaded upon the outer ends of the spokes, for the purpose specified.

4. In a vehicle wheel, the combination of a rim or felly; a hub comprising a metal shell and annular ribs or raised portions towards each end thereof, said rib portions having holes therein, the holes of each rib being arranged in a zigzag manner; a suitable boxing; a wood bushing, said boxing forced into said shell; metal spokes threaded at their outer ends and having hooks at their inner ends, adapted to be inserted in the holes in said hub shell, said spokes being arranged substantially tangential, those at one end of the hub being arranged tangentially opposite to those at the other; and nipples arranged through said rim threaded upon the outer ends of the spokes, for the purpose specified.

5. In a vehicle wheel, a combination of a rim or felly; a hub having a double series of holes therein, the holes of each series being arranged in a zigzag manner; metal spokes threaded at their outer ends and having hooks at their inner ends, adapted to be inserted in the holes in said hub, the inner ends of said spokes adjacent to the hooks thereof being curved to conform to the hub, said spokes being arranged substantially tangential, those at one end of the hub being arranged tangentially opposite to those at the other; and nipples arranged through said rim threaded upon the outer ends of the spokes, for the purpose specified.

6. A hub comprising a metal shell having a central enlargement or raised portion of comparatively thin metal, a tapered wood bushing within said shell tightly fitting at each end, with open space at the center between said bushing and shell, and a boxing fitted to the said wood bushing, for the purpose specified.

In witness whereof, I have hereunto set my hand and seal in the presence of two witnesses.

NELSON A. NEWTON. [L. S.]

Witnesses:
LULU GREENFIELD,
OTIS A. EARL.